No. 859,145. PATENTED JULY 2, 1907.
I. W. STEPHENSON.
COMBINED CHECK VALVE AND STOP COCK.
APPLICATION FILED AUG. 29, 1906.

WITNESSES:
INVENTOR
Irwin W. Stephenson
BY Watson E. Coleman
Attorney

UNITED STATES PATENT OFFICE.

IRWIN W. STEPHENSON, OF ELDON, IOWA.

COMBINED CHECK-VALVE AND STOP-COCK.

No. 859,145.      Specification of Letters Patent.      Patented July 2, 1907.

Application filed August 29, 1906. Serial No. 332,491

*To all whom it may concern:*

Be it known that I, IRWIN W. STEPHENSON, a citizen of the United States, residing at Eldon, in the county of Wapello and State of Iowa, have invented certain new and useful Improvements in a Combined Check-Valve and Stop-Cock, of which the following is a specification, reference being had therein to the accompanying drawing.

My invention relates to combined check valves and stop cocks for locomotive and other engine boilers, and has for one of its objects the providing of a device of the character described by which leakage is obviated and the use of which will insure proper seating of the valve.

A further object of the invention is to provide a combined check valve and stop cock which shall be simple and comparatively inexpensive in construction, neat in appearance, durable and effectual in operation, and that can be used to equal advantage on either side of the boiler.

A still further object of the invention is to provide a device of the character described whereby the seating of the valve is always insured, and at the same time the valve is always readily accessible and can be got at without reducing the pressure.

Other objects and advantages of the invention, as well as the structural features by which said objects are obtained will be made clear from an examination of the specification taken in connection with the accompanying drawings, in which.

Figure 1:
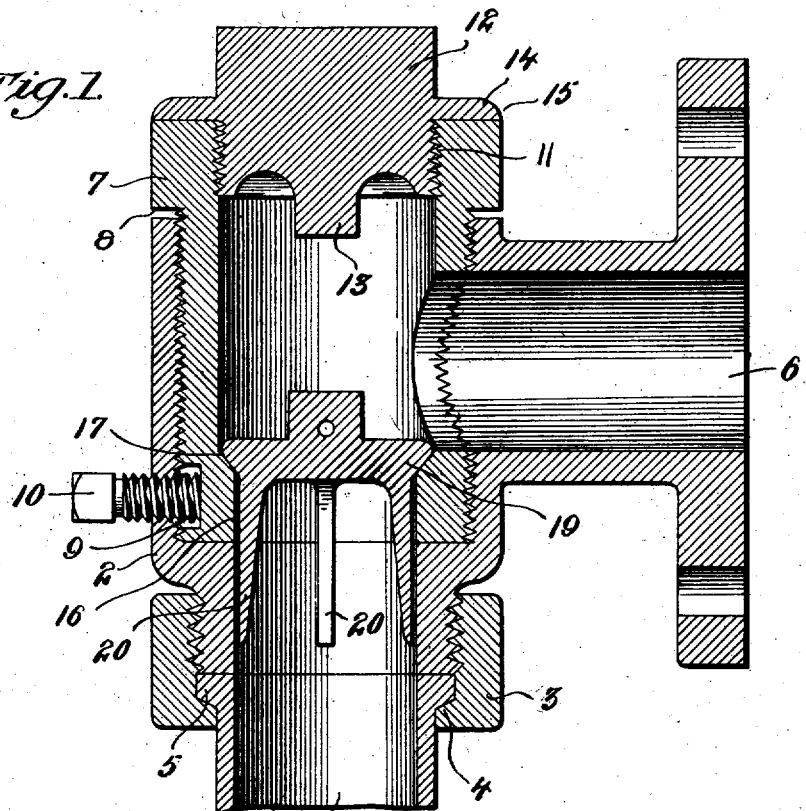
Figure 2:
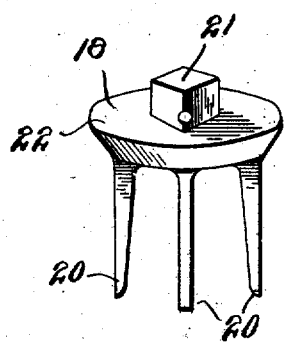

Figure 1 is a cross section through the valve and plug and showing the valve in operative position in the plug, and Fig. 2 is a perspective view of a valve constructed in accordance with my invention.

In the drawings 1 designates the feed pipe which is connected with the interiorly threaded casing or shell 2 of the stop cock by means of a coupling 3. The coupling is provided with an annular flange 4 adapted to lap over and engage an annular rim or projection 5 on the feed pipe, a portion of the interior of said coupling being threaded to engage corresponding threads on the shell 2 which is provided with an outlet or exhaust pipe 6. A plug 7 carrying exterior threads is adapted to screw into the interiorly threaded portion of the shell, as shown, said plug having its upper end enlarged to form an annular shoulder 8 so that as the lower end of the plug wears away said shoulder will come down and engage the top of the shell to form a complete joint, the outer surface of the plug being flush with the outer surface of the shell. This plug is also provided with an exterior groove 9 near its lower end, said groove extending about one-third of the way around the same, the object being to provide means for adjustably holding the plug in its proper position in the shell 2. Passing through a threaded opening in the shell or casing is a set screw 10 having its inner end resting in the groove and by means of which the plug is prevented from turning when in place in the casing. It will be noted upon reference to Fig. 1 that the groove 9 is of sufficient width to allow for the adjustment of the plug. Into the top of the plug 7, which is interiorly threaded as at 11, is adapted to screw a threaded cap 12, said cap having depending from the center thereof a lug or stop 13, and the upper portion being adapted to receive an ordinary wrench whereby it may be removed or screwed into position in the top of said plug. Formed integral with said cap is an annular flange or projection 14 having an outer edge 15 flush with the outer edge of the plug 7, said flange being adapted to bear against the top of the plug to form a complete joint.

The lower part of the interior wall of the plug is provided with an inwardly projecting annular enlargement 16, the upper wall 17 of which is slanted on an angle of about 45 degrees, and which affords a valve seat for the valve 18 which rests thereon. This valve comprises a circular disk 19, the outer wall of which is inclined at an angle equal to that of said wall 17 against which it bears, and by means of which the valve is received in the plug as shown at Fig. 1. Formed integral with said circular disk are depending legs or guides 20, the outer edges of which bear against the inner wall of the plug and the shell, and formed integral with the top of the disk is an upwardly extending lug 21 which, when the valve is raised in the plug, contacts the depending lug or stop 13 to limit the upward movement of said valve, and the legs 20 being of a length slightly greater than the distance between the lug 21 and the lug or stop 13, serve the purpose of retaining the valve in vertical position so that as soon as the pressure against the disk 18 is removed the valve drops down into its seat on the inclined wall 17.

The lug 21 is preferably square, as shown, for the purpose of affording means whereby the valve may be turned with an ordinary wrench to grind in the valve seat, and is also provided with a small hole whereby to lift the valve out of the plug with a bent wire or other suitable means when it cannot otherwise be conveniently reached.

It will be observed that the upper rim 22 of the disk 18 is made to fit precisely in the plug so that said valve may slide up and down with precision, it being aided in this by the legs or guides 20 which enable the plug to retain a perfectly vertical position at all times. To obtain access to the plug all that is necessary to do is to remove the cap 12 which can be easily removed and replaced at any time when the plug is turned in shut-off position. For the purpose of removing the cap 12 the top may be provided with small slots so that it can be turned with a spanner wrench.

From the foregoing it is thought the construction, operation, and advantages of the invention will be obvious to the skilled mechanic or engineer and further explanation is not deemed necessary.

Having thus described my said invention, what I claim as new, and desire to secure by Letters Patent of the United States is

1. A combined check valve and stop cock comprising a substantially T-shaped shell having its cross portion interiorly screw threaded, an exteriorly screw threaded hollow plug screwed into the cross portion of said shell and having a lateral aperture or opening adapted to be moved into and out of alinement with the third branch or right angularly projecting portion of said T-shaped shell, said plug having in its exterior a groove or recess, a valve seat in said plug, a check valve in said plug and a set screw in said shell to enter the groove or recess in said plug to lock the latter in an adjusted position.

2. A combined check valve and stop cock comprising a substantially T-shaped shell having its cross portion vertically disposed and interiorly screw threaded to a point adjacent to its lower end, an exteriorly screw threaded plug screwed into said shell, said plug having in its lower end a valve seat and in its exterior surface a segmental groove or seat, a check valve in said plug to co-act with said valve seat, a removable cap closing the upper end of the plug and having a projection to limit the opening of the check valve, and a set screw in said shell adapted to enter the groove or seat in said plug to lock the latter in an adjusted position.

3. A combined check valve and stop cock comprising an outer shell or casing having an inlet and an outlet duct, a plug removably and adjustably mounted in the shell, said plug having an interior annular enlargement at its lower end to form a valve seat, a removable cap for the plug, said cap having a depending lug formed integral therewith, a valve adapted to rest on the valve seat, said valve having an upwardly extending lug and adapted to contact the lug on the cap whereby the movement of said valve is limited, and legs or guide ways depending from the valve whereby the valve is retained in operative position in the plug, and a set screw passing through an opening in the casing and having its inner end resting in a groove in the outer face of the plug whereby said plug may be held in adjusted position against accidental removal or displacement.

4. A combined check valve and stop cock comprising an outer shell or casing having an inlet and an outlet duct, a plug removably and adjustably mounted within the casing, said plug having an interior enlargement near its lower end, the upper end wall of said enlargement being slanted to form a valve seat, means for holding the plug in adjusted position in the casing, a cap for the plug, said cap having a depending lug formed integral therewith, a valve slidable in the plug, the outer edge of said valve being slanted to fit the valve seat, said valve having also an upwardly extending lug adapted to engage the lug on the cap whereby the movement on the valve is limited and means for retaining the valve in operative position when sliding in the plug.

5. A combined check valve and stop cock comprising a substantially T-shaped shell having its cross portion interiorly screw threaded, an exteriorly screw threaded hollow plug screwed into said shell and having a lateral aperture or opening adapted to be moved into and out of alinement with the third branch or right angularly projecting portion of said T-shaped shell when said hollow plug is rotated in the cross portion of the shell, and a check valve arranged in said hollow plug.

6. A combined check valve and stop cock comprising a substantially T-shaped shell having its cross portion interiorly screw threaded, an exteriorly screw threaded hollow plug screwed into said shell and having a lateral aperture or opening adapted to be moved into and out of alinement with the third branch or right angularly projecting portion of said T-shaped shell when said hollow plug is rotated in the cross portion of the shell, a valve seat in said plug, a check valve in said plug to co-act with said valve seat, a closure for one end of said plug and means for locking said plug in an adjusted position in said shell.

In testimony whereof I hereunto affix my signature in presence of two witnesses.

IRWIN W. STEPHENSON.

Witnesses:
 E. H. FINNEY,
 S. HOLLENBECK.